(12) United States Patent
Or et al.

(10) Patent No.: US 11,480,366 B2
(45) Date of Patent: Oct. 25, 2022

(54) SOLAR WATER HEATING SYSTEM

(71) Applicant: WISESOL LTD., Zichron Ya'Akov (IL)

(72) Inventors: Efi Efraim Or, Zichron Ya'Akov (IL); Ron Galmor, Ramat Hasharon (IL)

(*) Notice: Subject to any disclaimer, the term of this patent is extended or adjusted under 35 U.S.C. 154(b) by 169 days.

(21) Appl. No.: 17/053,804

(22) PCT Filed: May 8, 2019

(86) PCT No.: PCT/IB2019/053785
§ 371 (c)(1),
(2) Date: Nov. 9, 2020

(87) PCT Pub. No.: WO2019/215639
PCT Pub. Date: Nov. 14, 2019

(65) Prior Publication Data
US 2021/0231348 A1    Jul. 29, 2021

Related U.S. Application Data

(60) Provisional application No. 62/668,294, filed on May 8, 2018.

(51) Int. Cl.
*F24D 3/00* (2022.01)
*F24D 3/18* (2006.01)
(Continued)

(52) U.S. Cl.
CPC ............ *F24S 60/30* (2018.05); *F24D 3/005* (2013.01); *F24D 3/18* (2013.01); *F24H 1/185* (2013.01); *F24H 1/202* (2013.01); *F24H 4/04* (2013.01); *F24D 2200/02* (2013.01); *F24D 2200/12* (2013.01); *F24D 2200/14* (2013.01); *F24D 2200/32* (2013.01); *F24H 2240/09* (2013.01)

(58) Field of Classification Search
CPC .................... F24D 2200/02; F24H 2240/09
See application file for complete search history.

(56) References Cited

U.S. PATENT DOCUMENTS 4,397,294 A * 8/1983 Mancebo ............ F24D 17/0068
126/610
4,805,662 A * 2/1989 Moody ................ F24H 9/2021
126/388.1
(Continued)

FOREIGN PATENT DOCUMENTS

WO    WO-03014627 A1 *  2/2003 ......... F24D 19/0092
WO    WO-2007000112 A1 * 1/2007 .......... F24D 11/0221

*Primary Examiner* — Avinash A Savani
*Assistant Examiner* — Deepak A Deean
(74) *Attorney, Agent, or Firm* — Alphapatent Associates, Ltd; Daniel J. Swirsky

(57) ABSTRACT

Systems and methods for a thermosyphonic water heating system for a storage tank. A DC heat pump receives power from a DC power source and heats water via a heat exchanger using a thermosyphonic piping system. A passive back-flushing having a cold water inlet pipe connected to the hot water return pipe draws cold water into the storage tank through the heat exchanger. A vertical array of temperature sensors distributed throughout the storage tank monitor temperature of stored water at multiple heights and a communication unit communicates monitored data to an external control device.

2 Claims, 16 Drawing Sheets

(51) Int. Cl.
*F24H 1/20* (2022.01)
*F24H 4/04* (2006.01)
*F24S 60/30* (2018.01)
*F24H 1/18* (2022.01)

(56) References Cited

U.S. PATENT DOCUMENTS

| | | | | |
|---|---|---|---|---|
| 5,038,420 | A * | 8/1991 | Chen | F24H 1/54 4/584 |
| 5,074,464 | A * | 12/1991 | Moore, Jr. | F24H 1/206 237/19 |
| 5,272,891 | A | 12/1993 | Erickson | |
| 7,089,763 | B2 * | 8/2006 | Forsberg | F24F 1/027 62/635 |
| 2003/0034149 | A1 * | 2/2003 | Harrison | F28D 20/0039 165/101 |
| 2004/0069006 | A1 * | 4/2004 | Hebert | F24H 4/04 122/406.1 |
| 2004/0173541 | A1 * | 9/2004 | Kurihara | B06B 1/0253 210/748.03 |
| 2005/0155364 | A1 | 7/2005 | Concha et al. | |
| 2006/0231046 | A1 * | 10/2006 | Homan | F24H 1/202 122/19.1 |
| 2010/0163016 | A1 | 7/2010 | Pan | |
| 2010/0197215 | A1 * | 8/2010 | Southhall | F24F 5/0046 454/236 |
| 2012/0205456 | A1 * | 8/2012 | Honma | F24D 19/106 237/2 B |
| 2012/0261102 | A1 * | 10/2012 | Hebert | F28D 7/0016 165/129 |
| 2013/0091627 | A1 * | 4/2013 | Kang | F24H 9/2014 219/509 |
| 2014/0137813 | A1 * | 5/2014 | Gross | F25B 27/02 62/238.7 |
| 2014/0153913 | A1 * | 6/2014 | Newman | F24D 19/1057 392/500 |
| 2014/0291411 | A1 * | 10/2014 | Tamaki | F24D 11/0214 62/238.7 |
| 2015/0033713 | A1 * | 2/2015 | Hodgson | B60K 13/04 60/287 |
| 2015/0077243 | A1 * | 3/2015 | Hooper | G08B 17/06 340/532 |
| 2015/0354833 | A1 * | 12/2015 | Kreutzman | F24D 17/02 392/308 |
| 2016/0033170 | A1 * | 2/2016 | Urbanski | F24H 9/2007 122/15.1 |
| 2016/0105018 | A1 * | 4/2016 | Wang | H01H 9/541 361/93.9 |
| 2018/0266701 | A1 * | 9/2018 | Sofer | F24D 19/1057 |
| 2019/0003725 | A1 * | 1/2019 | Hourigan | H02M 1/10 |
| 2022/0136711 | A1 * | 5/2022 | Leckinger | F24D 17/02 62/235.1 |
| 2022/0186980 | A1 * | 6/2022 | Hofmann | F24H 4/04 |

* cited by examiner

| System | unit 1 | unit 1 | unit 1 | unit 1 | unit 1 | unit 1 | unit 1 | unit 1 |
|---|---|---|---|---|---|---|---|---|
| Speed | 0 | 0 | 0 | 0 | 0 | 0 | 0 | 0 |
| Temp Boiler 1 | 65 | 65 | 65 | 65 | 65 | 65 | 65 | 65 |
| Temp Boiler 2 | 64 | 64 | 64 | 64 | 64 | 64 | 64 | 64 |
| Temp Boiler 3 | 62 | 62 | 62 | 62 | 62 | 62 | 62 | 62 |
| Temp Boiler 4 | 59 | 59 | 59 | 59 | 59 | 59 | 59 | 59 |
| Temp Boiler 5 | 43 | 43 | 43 | 44 | 44 | 44 | 44 | 44 |
| AVG | 58 | 58 | 58 | 58 | 59 | 58 | 59 | 59 |
| Temp External | 19 | 20 | 20 | 20 | 20 | 19 | 19 | 20 |
| Up | 39 | 39 | 39 | 39 | 39 | 39 | 39 | 39 |
| Down | 41 | 41 | 41 | 41 | 41 | 40 | 40 | 40 |
| Heat XCh Up | 39 | 39 | 39 | 39 | 38 | 38 | 38 | 38 |
| Heat XCh Down | 31 | 31 | 31 | 31 | 31 | 31 | 31 | 31 |
| EVP in | 18 | 18 | 18 | 18 | 18 | 18 | 18 | 18 |
| EVP out | 21 | 21 | 21 | 21 | 21 | 21 | 21 | 21 |
| Voltage | 47 | 47 | 47 | 47 | 47 | 47 | 47 | 47 |
| Current | 0 | 0 | 0 | 0 | 0 | 0 | 0 | 0 |
| Current PV | 0 | 0.1 | 0.2 | 0 | 0.1 | 0.1 | 0.1 | 0.2 |
| Pressure Low | 69 | 69 | 69 | 69 | 69 | 70 | 69 | 68 |
| Pressure High | 70 | 68 | 73 | 67 | 70 | 74 | 69 | 73 |
| EEV | 311 | 311 | 311 | 311 | 311 | 311 | 311 | 311 |
| Index | 4103 | 4104 | 4105 | 4106 | 4107 | 4108 | 4109 | 4110 |

Fig. 8B

SOLAR WATER HEATING SYSTEM

CROSS-REFERENCE TO RELATED APPLICATIONS

This application is a U.S. National Phase Application under 35 U.S.C. 371 of International Application No. PCT/IB2019/053785, which has an international filing date of May 8, 2019, and which claims priority and benefit from U.S. Provisional Patent Application No. 62/668,294, filed May 8, 2018, the contents and disclosure of which are incorporated herein by reference in their entirety.

FIELD OF THE INVENTION

The embodiments disclosed herein relate to solar heating systems. In particular the embodiments presented relate to storage heaters operable to heat water using either direct current electricity or alternating current electricity.

BACKGROUND

Storage heaters are used to provide hot water by heating a reservoir of water stored in a tank. Various fuels and heating methods may be used to heat the tank of water such as natural gas, propane, fuel oil, electricity or solar power.

Electric water heaters heat the reservoir of water using electrical resistance elements typically connected to an alternative current (AC) mains electricity supply such as a 220 volt 50 hertz alternative current electrical supply or a 110 volt 60 hertz. In order to control heating, a thermostat is provided which is operable to disconnect the electrical elements when water in the tank exceeds a threshold temperature.

Electrical water heaters may be combined with secondary heating methods. For example, a propane boiler may be provided with a backup electrical element for use when needed. Similarly in addition to electrical elements, solar powered water heaters may have a solar collector connected to the reservoir via piping such that water is drawn from the reservoir to the solar collector where it is heated and returned to the reservoir. Accordingly, solar thermal heated water tanks require a minimum of four access pipes: an inlet pipe for cold water into the tank, an outlet pipe for hot water from the tank, an outlet feeder pipe from the tank to the solar collector and an inlet return pipe from the solar connector to the tank.

In other solar powered water heaters the solar collector may not be directly connected to the reservoir but rather a separate closed loop may pump a heat transfer fluid or coolant through the solar collector and back into to a heat exchanger immersed within the reservoir. Although in closed loop systems the potable water does not pass through the solar connector the minimum of four access pipes are still required.

It will be appreciated that where such directly heated solar powered water heaters are integrated with electrical heaters, these are solar thermal systems. It will be appreciated that although solar thermal systems are a useful way to reduce fuel usage they require intricate fluid piping systems which are both difficult to install and significantly limit the sites in which the tanks and the solar collectors may be located. There is currently no way to integrate solar heating systems into a storage tank with fewer than four access pipes. Furthermore, solar thermal systems are prone to become damaged through a number of common faults such as freezing, leaks, corrosion, limescale, blockages (in particular within the solar collectors), metal contamination of the water (in particular copper contamination).

Solar energy may also be used to provide electricity typically using photovoltaic (PV) cells arrayed in panels. Photovoltaic cells produce direct current electricity which is not suitable for use with an AC electrical element. As a result, standard electrical storage heaters are not readily integrated with PV electrical sources. Instead a DC-AC power converter may be used to convert a DC input from the DC supply from the PV panels into an AC output for use powering the AC electrical heating unit.

Moreover the power required to heat an electrical element is hard to generate in a sustained manner using PV solar panels due to the variability of solar power available.

Other water heating systems may use heat pumps to heat the water. Heat pump systems generally use a heat exchanger to heat water stored in a storage tank directly. However, heating water in the storage tank directly has a number of drawbacks.

Firstly, because the whole volume of water contained in the storage tank is heated by the heat exchanger, the greater that volume, the lower the water temperature which can be reached. Furthermore, often limescale often build up in the storage tank around the heat exchanger which is difficult to clean, leads to inefficient heat transfer, and reduces the life time of the storage tank.

It will be appreciated that there is therefore a need for an efficient and convenient system for providing solar powered heating. The present disclosure addresses this need.

SUMMARY

It is one aspect of the current disclosure to introduce a thermosyphonic water heating system. The system may include at least one storage tank; at least one thermosyphonic water heating unit separate from the storage tank; at least one DC heat pump operable to receive power from a DC power source and to heat water in the at least one thermosyphonic water heating unit; a cold water advance pipe extending from a lower portion of the storage tank to a lower portion of the thermosyphonic water heating unit; and a hot water return pipe extending from an upper portion of the thermosyphonic water heating unit to an upper portion of the storage tank, such as a separate heating tank, a heat exchanger or the like.

The DC heat pump typically includes an evaporator configured to draw heat from the environment into a lower temperature refrigerant; a compressor configured to mechanically increase the temperature of the refrigerant; a condenser configured to transfer heat into the thermosyphonic water heating unit from the refrigerant; and a metering device configured to mechanically cool the refrigerant.

Optionally, the thermosyphonic water heating unit further comprising a heat exchanger comprising a heat exchange pipe within the storage tank such that a thermal transfer fluid from the heating tank is fluidly isolated from water stored in the storage tank. Accordingly, the heat exchanger further comprises a passive back-flushing module. In certain examples, the heat exchange pipe within the storage tank the heat exchange pipe has an outlet in the lower portion of the storage tank connected to the cold water advance pipe, and an inlet in the upper portion of the storage tank connected to the hot water return pipe.

In particular examples, the thermosyphonic water heating unit comprising a water heating tank separate from the storage tank.

Where appropriate, wherein the water thermosyphonic water heating unit is situated below the storage tank such that natural convection currents generate a circulation of colder fluid from the storage tank downwards the thermosyphonic water heating unit and heated fluid from the thermosyphonic water heating unit upwards to the storage tank.

In some examples, a solar panel may be electrically connected to the at least one the DC heat pump. Where appropriate, a common array of solar panels electrically connected to a plurality of the DC heat pumps, each the DC heat pump associated with a thermosyphonic water heating unit operable to heat water stored in an associated storage tank.

Variously, the system may further comprise an auxiliary AC heating unit, and or an auxiliary AC heat pump. Additionally or alternatively, the at least one DC heat pump comprises a battery. Accordingly, a unit selector may be provided to select between the DC power supply and an AC power line as required.

Where appropriate, an inverter unit is provided operable to generate a controllable pulsed DC signal and an inverter compressor. Accordingly, the system may include a controller operable to receive monitored system parameters and to determine a desired rotation rate for the inverter compressor. Additionally or alternatively, the inverter unit is configured to control at least one characteristic of the controllable pulsed DC signal selected from the group consisting of: frequency, duty cycle and amplitude.

Additionally or alternatively the system may further comprise a Maximum Power Point Tracking (MPPT) solar charge controller operable to regulate voltage output of a photovoltaic array and to select an efficient operating level.

In particular, a vertical array of temperature sensors is distributed throughout the storage tank such that the sensors are operable to monitor temperature of stored water at multiple heights.

Variously, other data collecting monitor sensors may be selected from the group consisting of: a high pressure sensors configured and operable to monitor pressure of refrigerant exiting a compressor of the DC heat pump; a low pressure sensor configured and operable to monitor pressure of refrigerant entering the compressor of the DC heat pump; a compressor rotation monitor configured and operable to record the rotation rate of the compressor; an external temperature sensor configured and operable to record ambient temperature in the vicinity of the storage tank; a high gas temperature sensor configured and operable to monitor temperature of refrigerant entering a heat exchanger; a low gas temperature sensor configured and operable to monitor temperature of refrigerant exiting the heat exchanger; a heat-exchange water high temperature sensor configured and operable to monitor temperature of water entering the heat exchanger; a heat-exchange water low temperature sensor configured and operable to monitor temperature of water exiting the heat exchanger; a DC current monitor configured and operable to monitor current drawn from the DC power source; a voltage monitor configured and operable to monitor voltage across the DC power source; an AC current monitor configured and operable to monitor current drawn from the electricity grid; and a metering device gas IN temperature sensor configured and operable to monitor temperature of refrigerant entering a metering device; a metering device gas OUT temperature sensor configured and operable to monitor temperature of refrigerant exiting a metering device; a metering device monitor configured and operable to monitor the status of a metering device of the DC heat pump and the like as well as combinations thereof.

Optionally, the system may further comprise a communication unit operable to communicate monitored data to an external control device. Accordingly, the communication unit is operable to receive control signals from an external control device. The control device may comprise a computing device, such as a smart phone or the like operable to execute stored code directed towards: receiving temperature data from the sensor array; calculating a required volume of water to be heated by the water heating system; selected required control parameters for the water heating system; and sending the control signals to the water heating system.

In particular examples, the system further comprises a DC deactivation unit operable to disconnect the DC heat pump from the DC power source. Where appropriate, the DC deactivation unit comprises: at least one DC circuit breaker comprising a first DC switch configured to disconnect a positive terminal of the DC power source from the DC heat pump and a second DC switch configured to disconnect a negative terminal of the DC power source from the DC heat pump; and at least one current monitor configured and operable to trigger the at least one DC circuit breaker if a current leakage is detected thereby disconnecting DC heat pump from the DC power source.

In another specific example, the system may include at least one storage tank; a heat exchanger; at least one DC heat pump operable to receive power from a DC power source and to heat water via the heat exchanger; a cold water advance pipe extending from a lower portion of the storage tank to a lower portion of the heat exchanger; a hot water return pipe extending from an upper portion of the heat exchanger to an upper portion of the storage tank; a passive back-flushing module comprising a cold water inlet pipe connected to the hot water return pipe and configured such that whenever hot water is drawn from the storage tank, cold water is drawn into the storage tank through the heat exchanger and the cold water advance pipe; a vertical array of temperature sensors distributed throughout the storage tank, the sensors operable to monitor temperature of stored water at multiple heights; and a communication unit operable to communicate monitored data to an external control device.

In another aspect of the current disclosure a method is taught for thermosyphonically maintaining a reservoir of hot water. The method comprises: providing at least one storage tank; providing at least one thermosyphonic water heating unit separate from the storage tank; providing at least one DC heat pump comprising an evaporator configured to draw heat from the environment into a lower temperature refrigerant; a compressor configured to mechanically increase the temperature of the refrigerant; a condenser configured to transfer heat into the thermosyphonic water heating unit from the refrigerant; and a metering device configured to mechanically cool the refrigerant; providing at least one cold water advance pipe comprising an inlet and an outlet; connecting the inlet of the cold water advance pipe to a lower portion of the storage tank; connecting the outlet of the cold water advance pipe to a lower portion of the thermosyphonic water heating unit; providing at least one hot water return pipe comprising an inlet and an outlet; connecting the outlet of the hot water advance pipe to an upper portion of the storage tank; connecting the inlet of the hot water advance pipe to an upper portion of the thermosyphonic water heating unit; and electrically connecting the compressor of the DC heat pump to a DC power source thereby heating water via the thermosyphonic water heating unit.

Optionally, the step of connecting the inlet of the cold water advance pipe to a lower portion of the storage tank comprises connecting the inlet of the cold water advance pipe to a lower end of a heat exchange pipe within the storage tank, and the step of connecting the inlet of the hot water advance pipe to an upper portion of the storage tank comprises connecting the inlet of the cold water advance pipe to an upper end of the heat exchange pipe.

Where appropriate the step of electrically connecting the compressor of the DC heat pump to a DC power source my comprise connecting the compressor to a photovoltaic solar panel.

Additionally or alternatively, the method may further comprise situating the thermosyphonic water heating unit below the storage tank such that natural convection currents generate a circulation of colder fluid from the storage tank downwards towards the thermosyphonic water heating unit and heated fluid from the thermosyphonic water heating unit upwards to the storage tank.

Where appropriate, the method may further include monitoring system parameters; and determining a desired rotation rate for the inverter compressor. Accordingly, the method includes controlling at least one characteristic of a controllable pulsed DC signal selected from the group consisting of: frequency, duty cycle and amplitude.

Furthermore, methods may include regulating voltage output of a photovoltaic array and selecting an efficient operating level.

In particular methods are taught for monitoring parameters of the system such as monitoring: temperature of stored water at multiple heights within the storage tank; pressure of refrigerant exiting a compressor of the DC heat pump; pressure of refrigerant entering the compressor of the DC heat pump; rotation rate of the compressor; ambient temperature in the vicinity of the storage tank; temperature of refrigerant entering a heat exchanger; temperature of refrigerant exiting the heat exchanger; temperature of water entering the heat exchanger; temperature of water exiting the heat exchanger; current drawn from the DC power source; voltage across the DC power source; current drawn from the electricity grid; temperature of refrigerant entering a metering device; temperature of refrigerant exiting a metering device; and status of the metering device of the DC heat pump.

As required, the method further includes communicating monitored data to an external control device and/or receiving control signals from an external control device.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the several selected embodiments may be put into practice. In the accompanying drawings:

FIG. 8B is a table illustrating possible data collected by a system parameter monitor for use in remote control of a water heating system;

DETAILED DESCRIPTION

Figure 1A:
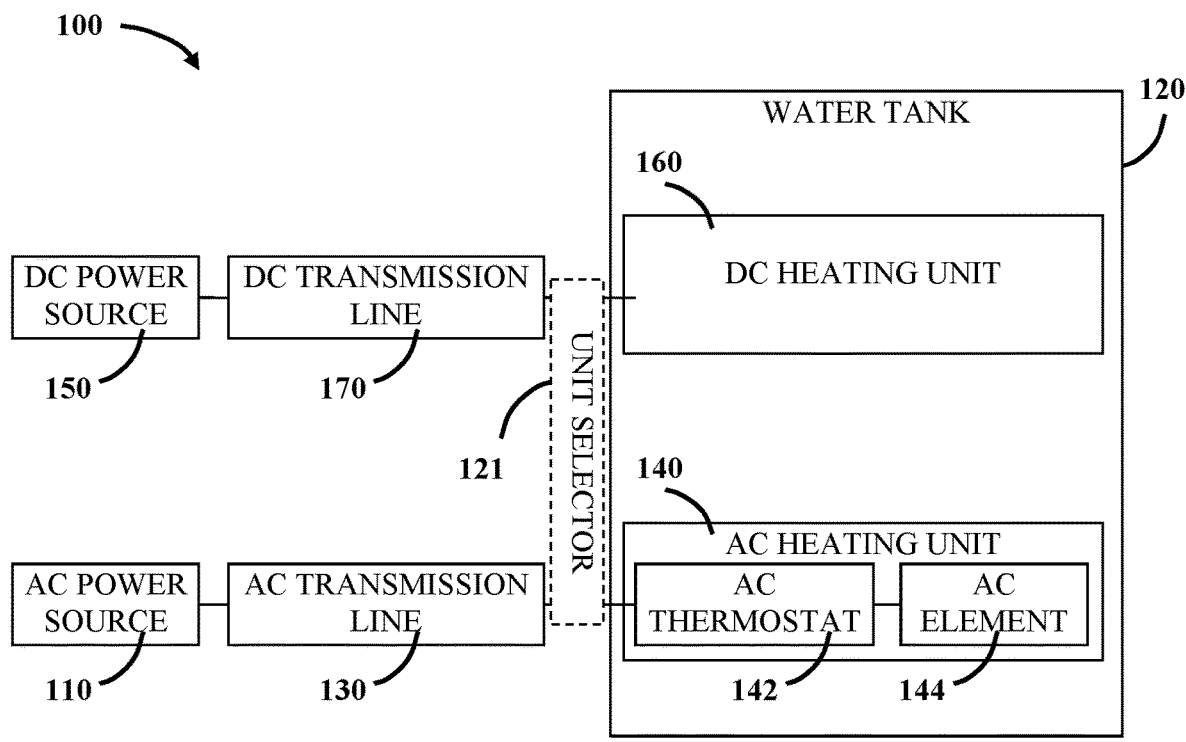
FIG. 1A is a block diagram schematically representing an embodiment of a storage heating system including both an AC heating unit and a DC heating unit operable to heat water installed in a common tank.

It is noted that the systems and methods of the invention herein may not be limited in their application to the details of construction and the arrangement of the components or methods set forth in the description or illustrated in the drawings and examples. The systems and methods of the invention may be capable of other embodiments or of being practiced or carried out in various ways.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting.

In various embodiments of the invention, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard-disk, flash-drive, removable media or the like, for storing instructions and/or data. Optionally, a network connection may additionally or alternatively be provided. User interface devices may be provided such as visual displays, audio output devices, tactile outputs and the like. Furthermore, as required user input devices may be provided such as keyboards, cameras, microphones, accelerometers, motion detectors or pointing devices such as mice, roller balls, touch pads, touch sensitive screens or the like.

Reference is now made to the block diagram of FIG. 1A which schematically represents an embodiment of a storage heating system 100 including both an alternating current (AC) heating unit 140 and a direct current (DC) heating unit 160.

It is a particular feature of the storage heating system 100 that both the AC heating unit 140 and the DC heating unit are operable to heat water installed a single water tank 120.

Furthermore it is particularly noted that the storage heating system 100 draws power from at least two sources of electricity, an AC power source 110, such as an electrical grid and also a DC power source 150 such as a solar panel having an array of photovoltaic (PV) cells. The AC heating unit 140 is connected to the AC power source 110 via an AC transmission line 130 such as a mains line. The DC heating element 160 is connected to the DC power source 150 via a DC transmission 170.

The AC heating unit 140 may includes at least one AC heating element 144 and an AC thermostat 142. The AC thermostat 142 is operable to deactivate the AC heating element 142 when water contained within the storage heater exceeds a threshold temperature thereby preventing overheating of the system when heated by the AC element. Typically the threshold temperature may be set manually as required.

It is noted that where appropriate, the AC heating unit 140 may include multiple AC heating elements (not shown). For example an upper AC heating element may be provided for use during periods of heavy water usage and a lower AC heating element may be provided for use as a recovery heater. Accordingly each AC heating element may have its own thermostat.

Various DC heating units 160 may be used, for example, a DC heat pump maybe provided which is operable to receive power from a DC power source and to heat water stored in the at least one water heating tank via a thermosyphonic heat transfer unit such as described herein. Alternatively, the DC heating unit 160 may itself include at least one DC heating element and a DC thermostat.

A DC thermostat may be operable to deactivate the DC heating unit when water contained within the storage heater exceeds a threshold temperature thereby preventing overheating of the system when heated by the DC element. The threshold temperature setting of the DC thermostat may be equal to the threshold temperature setting of the AC thermostat or alternatively the AC thermostat and the DC thermostat may have different threshold temperature settings.

It is particularly noted that because DC switches may be prone to arcing, the DC thermostat may be characterized by the inclusion of arc protection components such as arc suppressing capacitors or the like.

Where a DC heating element is provided, it is further noted that, by way of example, the DC heating element may include an outer sheath, a heating coil, an unheated zone including a first cold pin connecting the heating coil to a positive DC connector and a second cold pin connecting the heating coil to a negative DC connector, and an insulating filler disposed between the outer-sheath and the heating coil. The heating coil may be selected to have a resistance of between 5 to 15 ohms when a voltage of 40-120 volts is applied between the positive DC connector and the negative DC connector.

Optionally the maximum power output of the DC heating element may range from 200 watts to 120 watts, with a possible optimum operation voltage of about 75 volts, a possible optimum operation current between 6 amps to 16 amps, an open circuit voltage of about 90 volts, a short circuit current between 6 amps to 16 amps.

Where required, optionally, the storage heating system 100 may further include a unit selector 121 operable to select either the AC heating unit, the DC heating unit or both as suit requirements. Factors effecting the selection of the appropriate heating unit may include availability of DC power, which may depend upon availability of solar energy, for example, or power level of an electrochemical cell or the like. Thus the DC heating element may be preferred during the day when solar energy is available.

Furthermore, where required, the AC heating element may be operable to respond to an intelligent electrical power distribution system. Thus, for example, the AC heating element may be activated remotely by the AC power supplier via loadshedding requests.

Figure 1B:
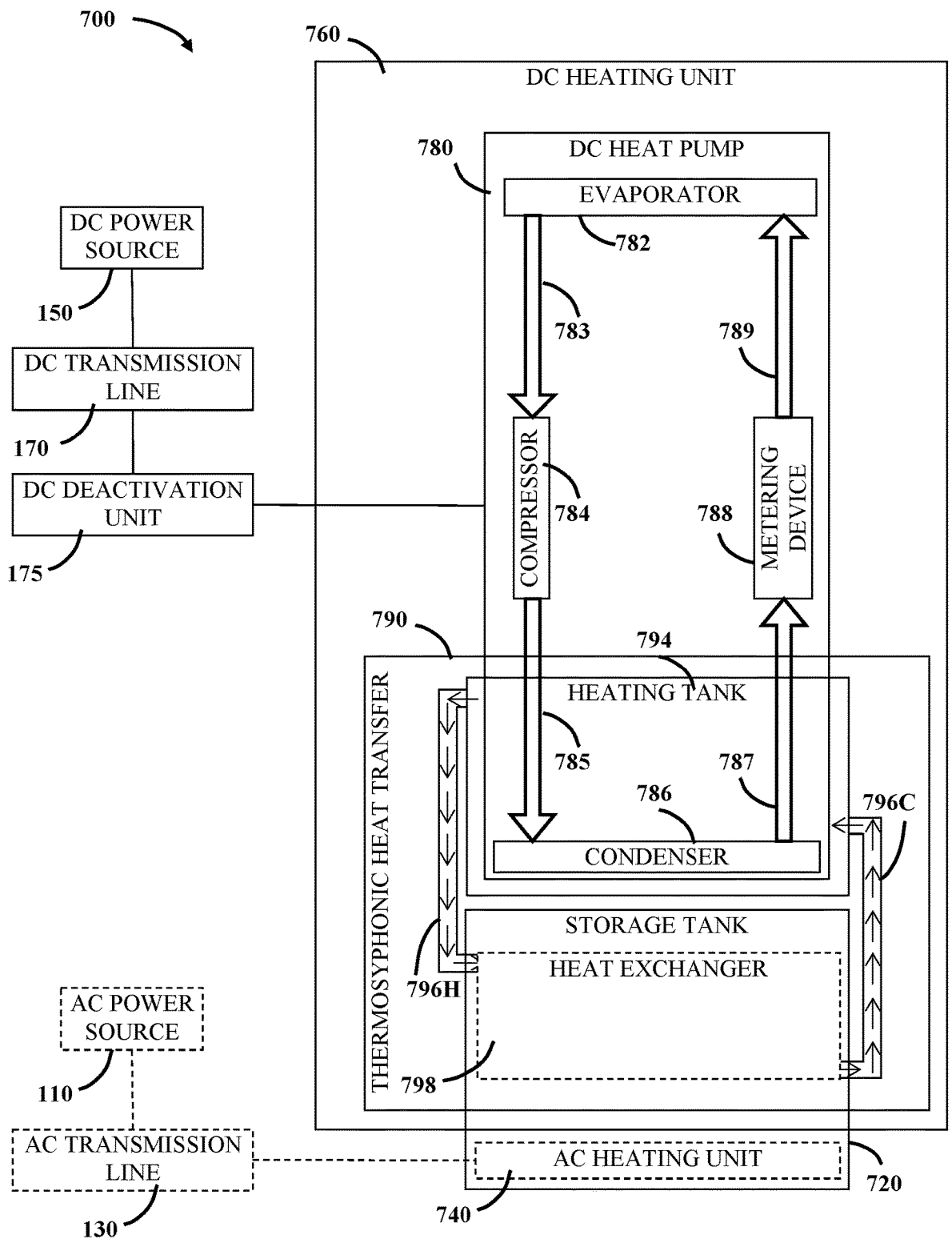
FIG. 1B is a block diagram schematically representing a heat pump embodiment of a storage heating system including a DC heat pump thermosyphonic water heating unit.

Reference is now made to the block diagram of FIG. 1B which schematically represents an embodiment of a storage heating system 700 including a DC heat pump thermosyphonic heat transfer based heating unit 760 configured to heat water stored in a storage tank 720.

The DC heating unit 760 includes a DC heat pump 780 and a thermosyphonic heat transfer unit 790. The DC heat pump 780 is operable to receive power from a DC power source 150, such as a solar panel having an array of photovoltaic (PV) cells or the like, via a DC transmission line 170. Where appropriate, a DC deactivation unit 175 may be provided to disconnect the DC heat pump from the DC power source when a current leakage is detected which my indicate a dangerous fault.

The DC deactivation unit may include a DC circuit breaker and a DC current monitor. The DC circuit breaker typically includes a first DC switch configured to disconnect the positive terminal of the DC power source from the DC heat pump and a second DC switch configured to disconnect the negative terminal of the DC power source from the DC heat pump. The DC current monitor such as an ammeter, galvanometer or the like may be configured and operable to trigger the DC circuit breaker when a current leakage is detected thereby disconnecting DC heat pump from the DC power source.

Optionally the storage heating system 700 may further include a AC heating unit 740 installed configured to heat water stored in a storage water tank 720. Thus the storage heating system 700 may draw power from both an AC power source 110, as well as the DC power source 150. The AC heating unit 140 is connected to the AC power source 110 via an AC transmission line 130 such as a mains line.

The thermosyphonic heat transfer unit 790 of the DC heating unit 760 includes a heating tank 794 in fluid communication with the storage tank 720 via a cold water advance pipe 796C and a hot water return pipe 796H. Accordingly cold water from the bottom of the storage tank 790 can flow via the advance pipe 796C to the heating tank 794 and hot water from the top of the heating tank 794 can flow via the return pipe 796C to the top of the storage tank 790 thereby heating the water in the storage tank 790. Additionally or alternatively, the thermosyphonic heat transfer unit may include a heat exchanger 798 within the storage tank 720 container such that a thermal transfer fluid from the heating tank 794 is fluidly isolated from the water stored in the storage tank 740.

It is a particular feature of the DC heating unit 760 that the water in the heating tank 794 is heated by the DC heat pump 780. The DC heat pump 780 includes an evaporator 782, a compressor 784, a condenser 786 and a metering device 788. Refrigerant 783 flows from the evaporator 782, where it draws heat from the environment, into the compressor 784 where the pressure of the refrigerant is increased mechanically thereby increasing its temperature. The high temperature refrigerant 785 flows into the condenser 786 which is situated inside the heating tank 794 such that heat is transferred to the liquid stored within. The returning refrigerant 787 passes through a metering device 788, such as an expansion valve which may be electrically controlled via a control module or the like, such that its pressure and temperature is reduced before the cool refrigerant 789 returns to the evaporator 782 and the cycle repeats. Accordingly the DC heating unit 760 is operable to heat the water stored in the storage tank 720.

It will be appreciated that additionally or alternatively to the thermosyphonic heat transfer systems, other embodiments of the heating system may include an auxiliary pump (not shown) provided to maintain a pressure difference to drive a current of cool water from the storage tank via the the advance pipe and a current of warm water to the storage tank via the return pump.

Figure 2A:
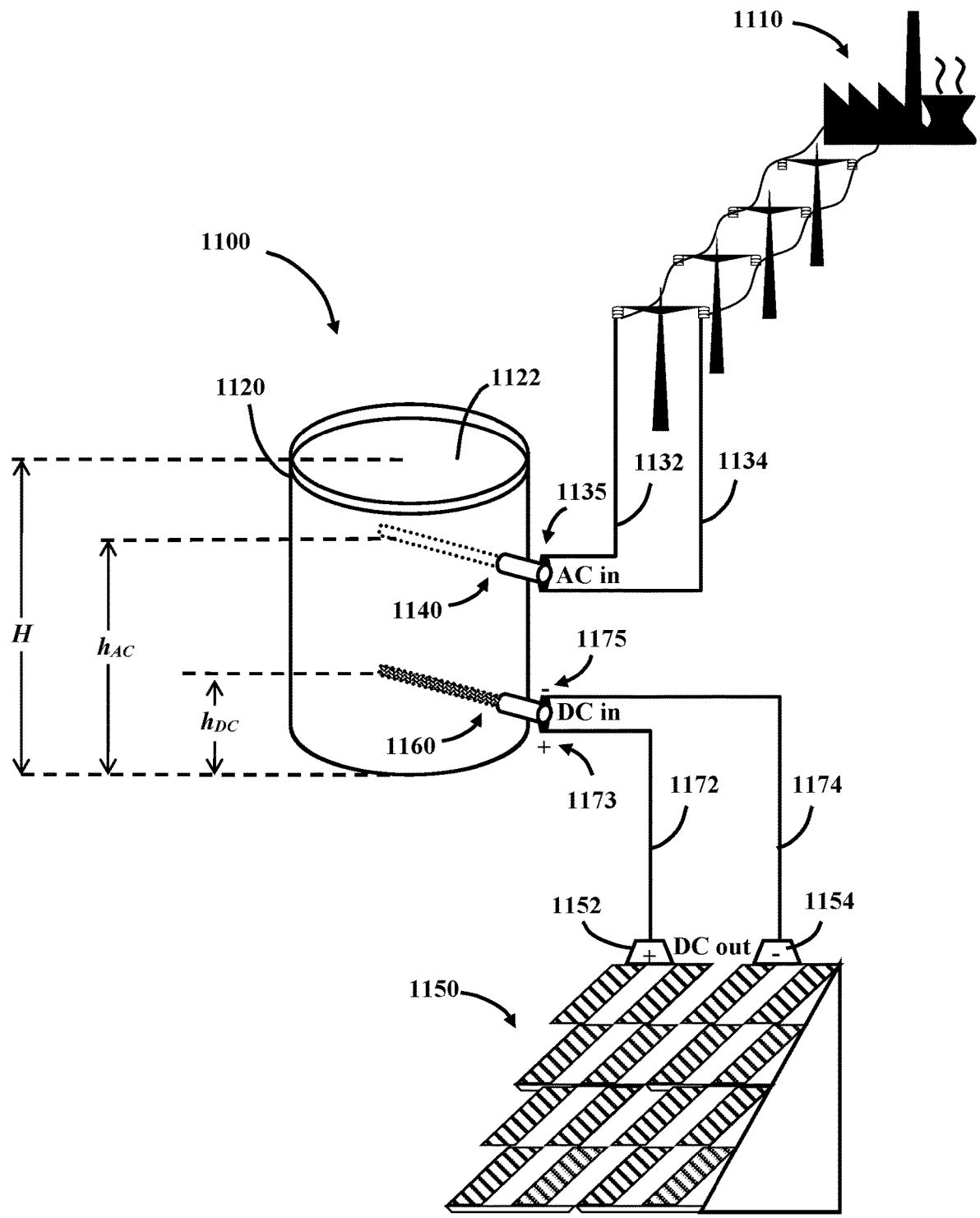
FIGS. 2A-C is a schematic diagram representing selected features of various embodiments of the solar heating system of the current invention.

Reference is now made to FIG. 2A schematically representing selected elements of another example of the solar heating system 1100. The solar heating system 1100 includes a storage tank 1120, an AC heating element 1140 and a DC heating element 1160.

The storage heater 1120 is filled with water 1122 to a fill-height H. The water may be heated by either the AC heating unit 1140, the DC heating unit 1160 or both as required. The AC heating unit 1140 is immersed into the water reservoir 1122 at a maximum element-height of $h_{AC}$ where $h_{AC}$ is less than or equal to two-thirds of the fill-height H. Similarly, the DC heating unit 1160 is immersed into the water reservoir 1122 at a maximum element-height of $h_{DC}$ where $h_{DC}$ is less than or equal to two-thirds of the fill-height H. It is noted that the AC heating unit may include an AC heating element and an AC thermostat, and the DC heating unit may include an DC heating element and an DC thermostat as described herein.

It is further noted that storage tank 1120 of the solar heating system 1100 disclosed herein is particularly characterized by only requiring a single water inlet for fresh water and a single outlet for providing hot water on demand. It is a particular advantage of the solar heating system 1100 of the embodiment that unlike the four access pipes required by solar heaters of the prior art, the storage tank 1120 requires only two access pipes are required.

In the first example, the AC heating unit 1140 is installed as an upper heating element and the DC heating unit 1160 is installed as a lower heating element. Accordingly, the AC heating unit 1140 may be used to provide additional heating of the water 1122 at times of high water usage and the DC heating unit 1160 may be used as a recovery heater to provide a background heating as solar power is available.

It will be appreciated that the positions of the DC heating unit 1160 and the AC heating unit 1140 of the invention may be different that the positions indicated herein, for example the DC heating element may be situated higher than the AC heating element or at the same height as required.

The DC power supply of the first example is a solar panel 1150 including an array of photovoltaic cells wired to a positive DC output terminal 1152 and a negative DC output terminal 1154. The positive DC output terminal 1152 is wired to a DC positive transmission line 1172, which is wired to a positive DC input terminal 1173 of the DC heating unit 1160. Similarly, the negative DC output terminal 1154 is wired to a DC negative transmission line 1174, which is wired to a negative DC input terminal 1175 of the DC heating unit 1160.

The AC power supply of the first example is a mains connection to a power grid drawing power from a power station 1110. The mains connection typically has a live transmission line 1132 and a neutral transmission line 1134 leading to a pair of AC input terminals 1135.

It is also noted that although a vertically storage tank is indicated in the figures, the solar heating system may be equally integrated into a horizontally orientated storage heating tank.

Figure 2B:
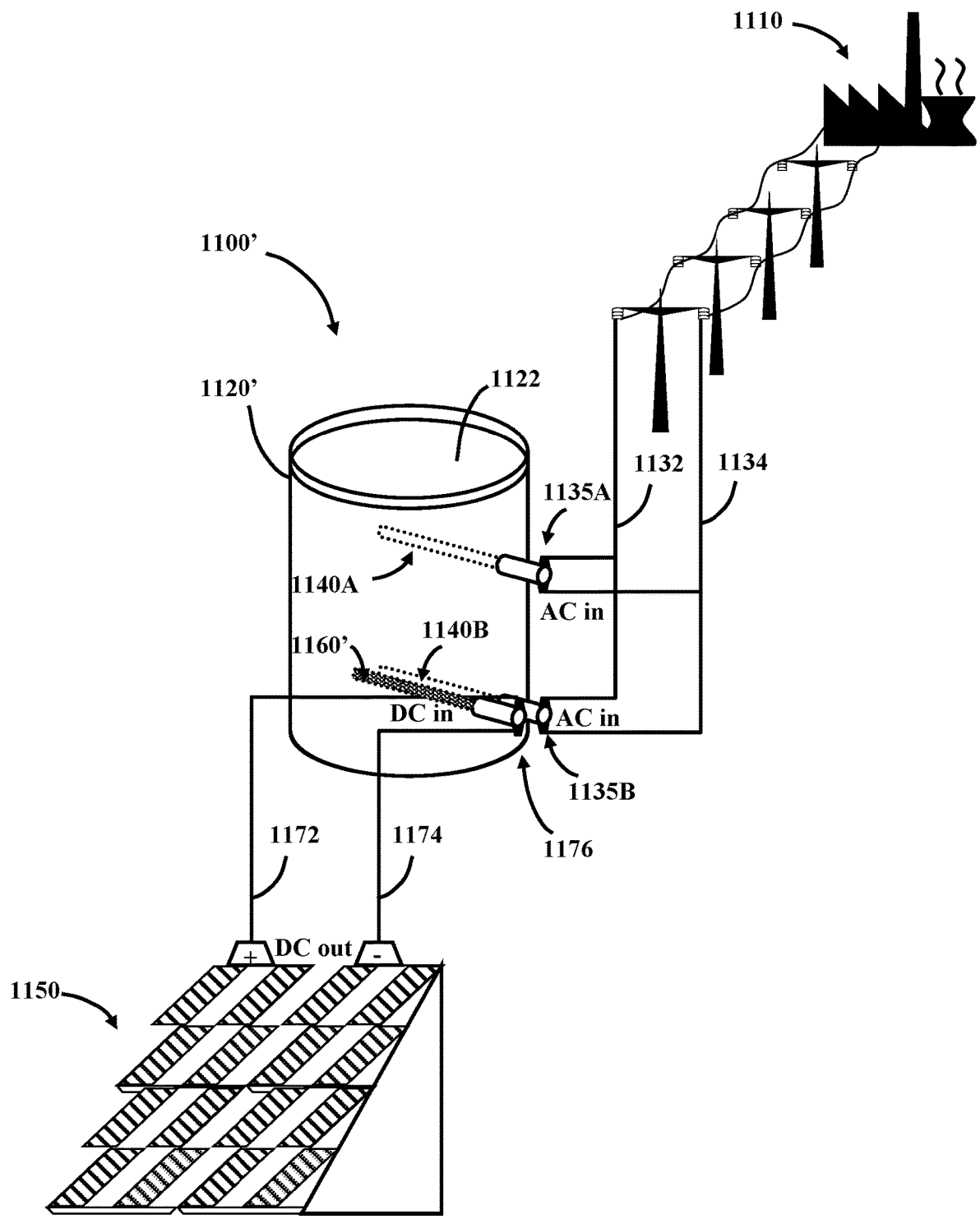

Referring now to FIG. 2B, a further example of the solar heating system 1100' is represented. The solar heating system 1100' includes a storage heater 1120' having a dual element AC heating unit including an upper AC heating element 1140A and a lower AC heating element 1140B. Both the upper AC heating element 1140A and the lower AC heating element 1140B are connected to the mains transmission lines 1132, 1134 via separate AC input terminals 1135A, 1135B.

In addition to the AC heating unit 1140A, 1140B the second example of the solar heating system 1100' further includes a DC heating unit 1160' which is installed alongside the lower AC heating unit 1140B and is connected to the solar panel via the positive DC transmission line 1172 and the negative DC transmission line 1174 which are wired to a pair of DC input terminals 1176.

It is noted that the DC heating unit 1160 and the lower AC heating unit 1140 may be mounted to a common retrofittable terminal block as described hereinbelow.

Figure 2C:
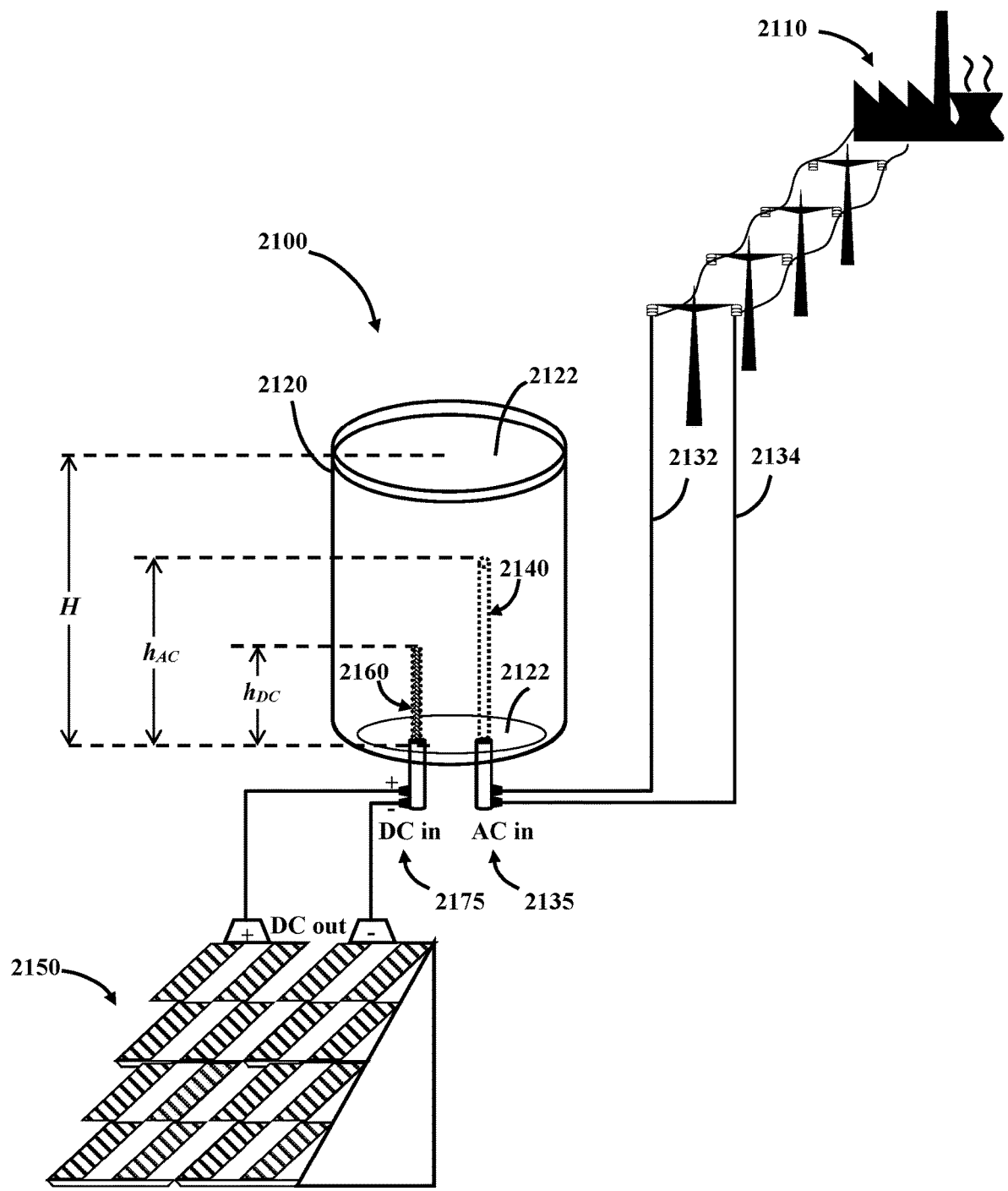

With reference to FIG. 2C selected features of still another example of the solar heating system 2100 are represented. The third example of the solar heating system 2100 includes a storage heater 2120', an AC heating element 2140 and a DC heating element 2160.

The AC heating unit 2140 and the DC heating unit 2160 are both mounted to a common base plate 2124. It is noted that the bottom mounted AC heating unit may include an AC heating element and an AC thermostat, and the bottom mounted DC heating unit may include an DC heating element and an DC thermostat as described above in reference to FIG. 1. Accordingly the base plate may include an AC heating element dock for accommodating the AC heating element, an AC thermostat dock for accommodating the AC thermostat, a DC heating element dock for accommodating the DC heating element, and a DC thermostat dock for accommodating the DC thermostat. An example of a retrofittable base plate is described hereinbelow.

The bottom mounted AC heating unit is connected to an AC power source 2110 via mains transmission lines 2132, 2134 wired to a pair of AC input terminals 2135. Similarly the bottom mounted DC heating unit is connected to a DC power source such as a solar panel 2150 via pair of DC input terminals.

Figure 3:
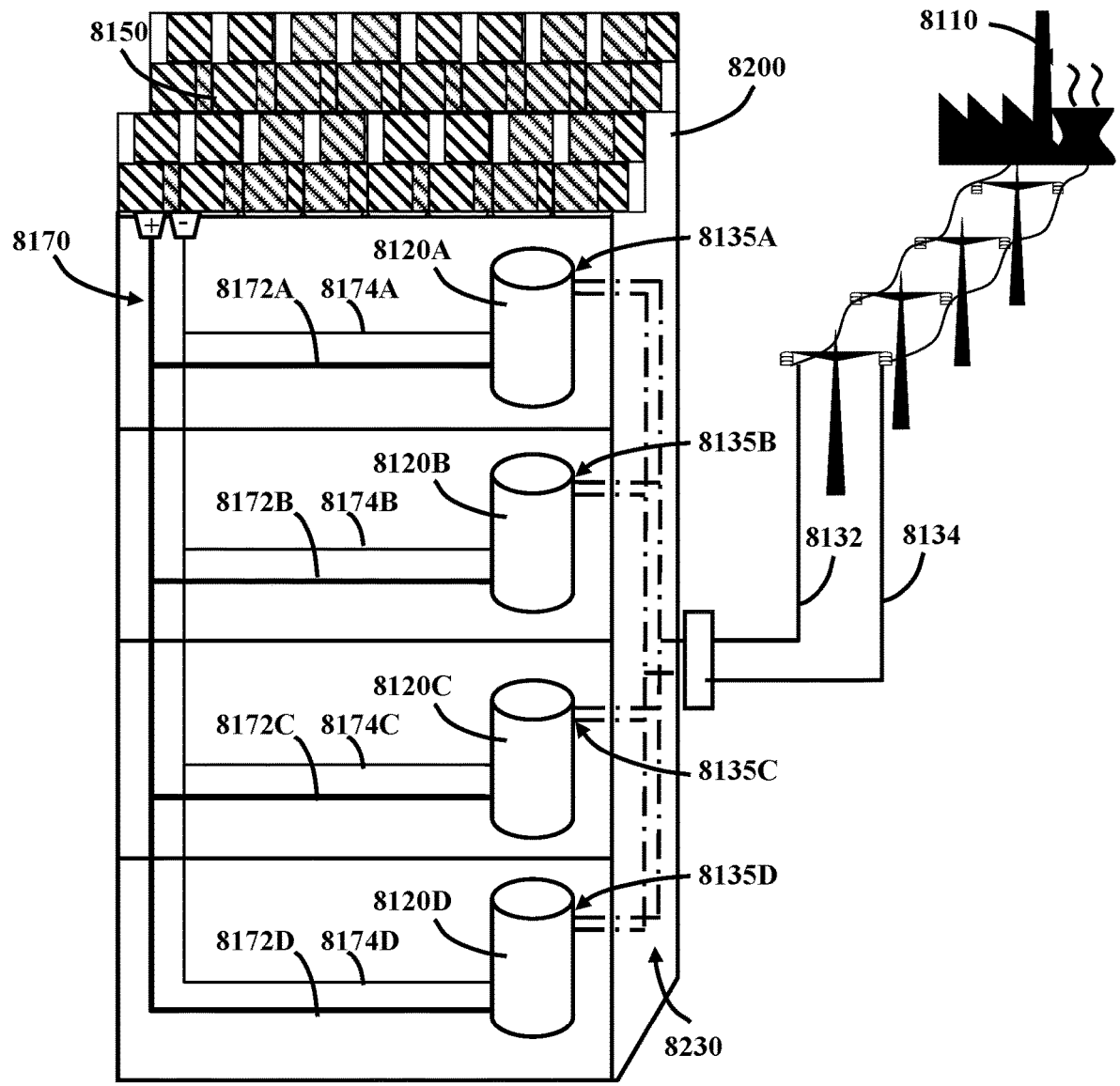
FIG. 3 is a schematic representation of a possible implementation of the solar heating system for use in a multiple unit building sharing a common array of solar panels.

By way of further illustration of the principle of the solar heating system, reference is now made to FIG. 3 schematically representing a possible implementation of the solar heating system 8100 for use in a building 8200 having multiple storage heating tanks 8135A-D all drawing power from both an AC power source 8110 and a common array of roof mounted solar panels 8150.

The building 8200 includes a central AC mains line 8230 connected to the AC power source 8110 such as a power station, generator or the like, via live and neutral AC transmission lines 8132, 8134. Each storage heating tank 8120A-D is connected to the AC mains line 8230 via its own pair of AC input terminals 8135A-D.

Furthermore, the building has a set of roof mounted solar panels 8150 which are connected to a central DC power transmission line 8170 which may provide DC power to each storage heating tank 8120A-D via dedicated DC positive and negative transmission lines 8172A-D, 8174A-D.

It is noted that where appropriate, the roof mounted solar panels may replace roof mounted solar thermal heat collectors to provide a central DC electricity supply. Accordingly, solar energy may be collected and transferred to the storage heating tanks via electrical conduction transmission lines and DC heating elements rather than via complicated and damage prone fluid communication lines and heat exchangers.

Although only roof mounted solar panels are represented herein, it is noted that wall mounted or window mounted solar panels may be integrated into the system. It is further noted, photovoltaic cells do not require direct sunlight and where necessary may be mounted upon any of a south facing, north facing, east facing, west facing or any other directed wall of a building. Nevertheless, PV cells may be more effective if orientated towards the sun. Thus in the Northern Hemisphere, south facing solar panels are generally to be preferred and in the Southern Hemisphere, north facing solar panels are generally to be preferred. In other embodiments, solar tracking mountings may be used which are operable to orientate the solar panels towards the sun across an east to west path throughout the day or a north-south path according to the varying elevations of the sun throughout the year.

Figure 4:
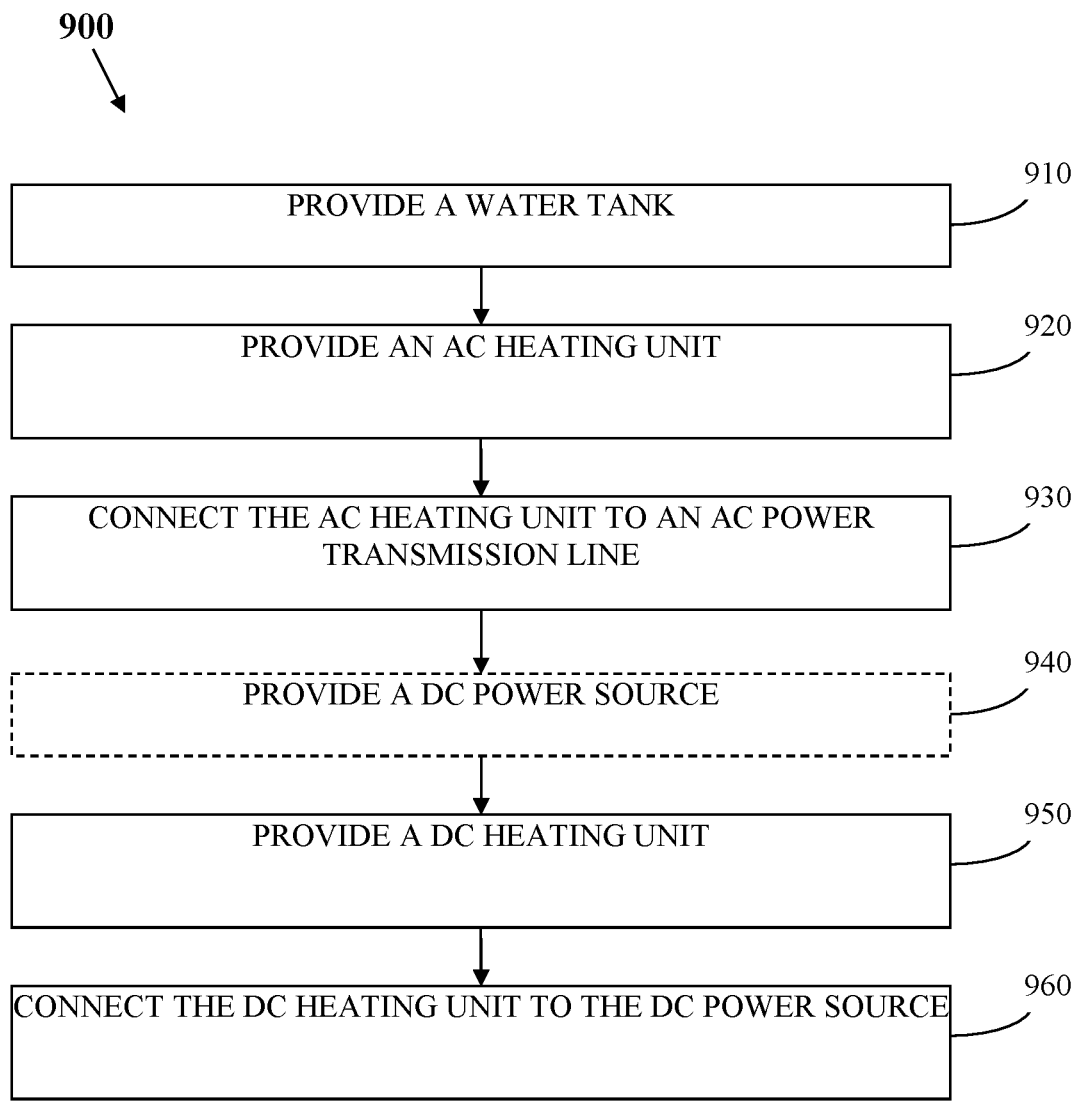
FIG. 4 is a flowchart showing the steps of a method for providing a solar heating system of the current invention.

Referring to the flowchart of FIG. 4, selected steps are presented of a method 900 for providing a solar heating system of the current invention. A storage heating tank is provided 910, for example a water tank suitable for heating and storing water contained therein. An AC heating unit is provided 920, the AC heating unit generally including a heating element connected to a thermostat is operable to draw power from an AC source, such as a mains line and to heat water contained within the tank. The AC heating unit may be connected to the AC power transmission line 930. It is noted that, where a DC heating unit is to be retrofitted to an existing dual element AC storage heating tank, the AC heating unit provided may already be connected to the AC transmission line.

A DC heating unit is provided 950. Such a DC heating unit may be a retrofittable DC heating element connected to a DC thermostat. Accordingly, the step of providing the DC heating unit may further include removing an existing AC heating unit and replacing it with at least a DC heating unit. As described hereinabove, in various embodiments, an existing AC heating unit may be replaced by both a DC heating unit and a new AC heating unit, as required.

Accordingly, where the storage heating tank comprises a prior fitted heating unit, the method may further include: providing a retrofittable heating unit comprising the AC heating unit and the DC heating unit; removing the prior fitted heating unit; and retrofitting the retrofittable heating unit to the storage heating tank. Variously, the retrofittable heating unit may be fitted by screwing the retrofittable heating unit into the storage heating tank, by bolting the retrofittable heating unit to the storage heating tank or the like.

The DC heating unit is connected to a DC power source 960, such as a solar panel or the like. Where no DC power source is available, a DC power source may be provided 940. For example a solar panel may be set up such that an array of photovoltaic cells collect solar power converting it into DC electric output.

Figure 5:
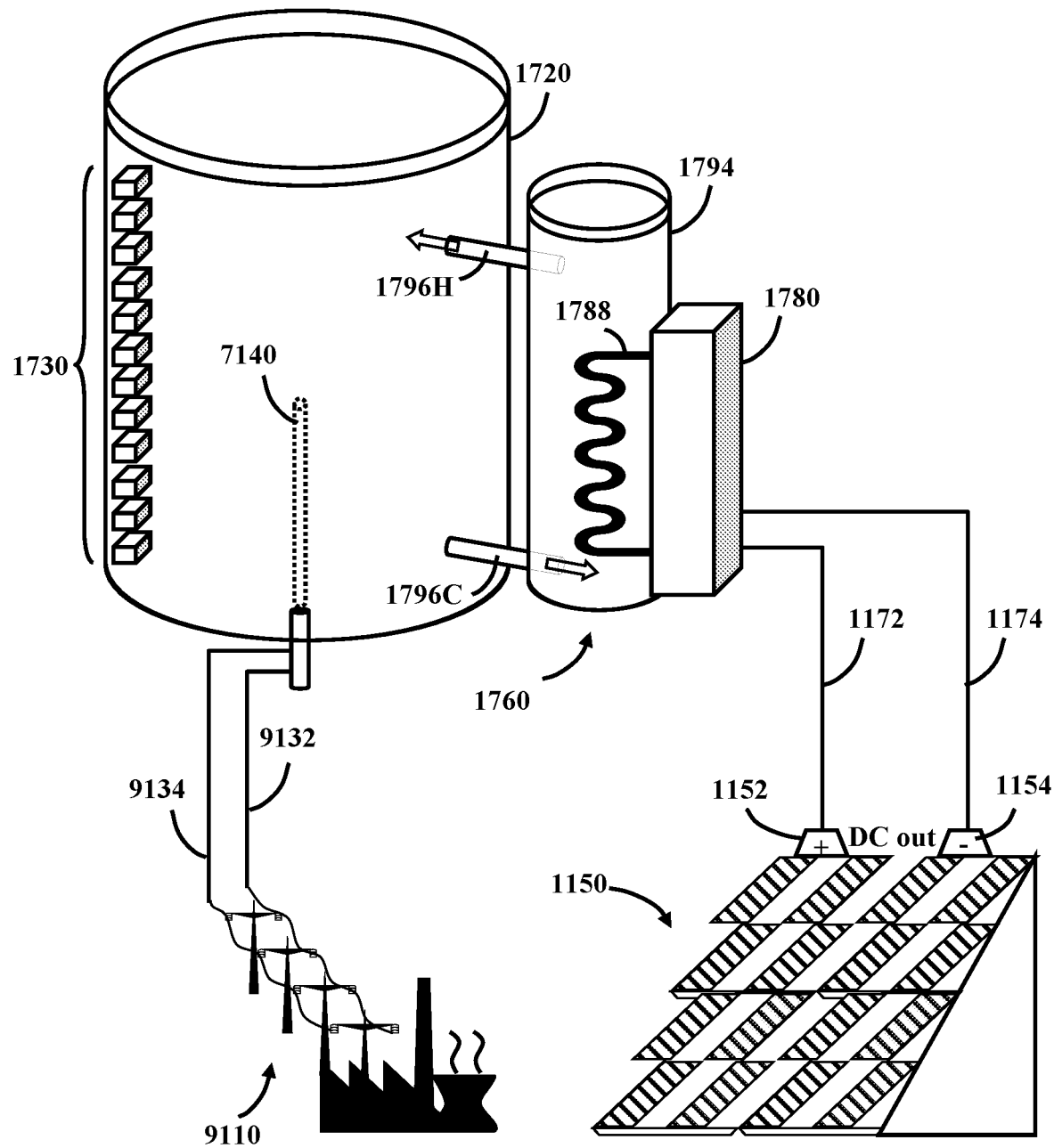
FIG. 5 is a schematic diagram representing selected features of the heat pump embodiment of the solar heating system.

Reference is now made to FIG. 5 schematically representing selected elements of a DC heat pump thermosyphonic solar heating system 1700. The solar heating system 1700 includes a storage tank 1720, and a DC heat pump thermosyphonic heating module 1760 comprising an a DC heat pump unit 1780 and an external heating tank 1794 which is connected to the storage tank via a cold water advance pipe 1796C and a hot water return pipe 1796H, optionally the system may also include an AC heating element 1740.

Although, for illustrative purposes, a side mounted heat pump is represented in FIG. 5, it will be appreciated that where required other configurations may be preferred such as a monoblock single unit having dimensions suitable for fitting under the storage heater or the like.

Optionally, a vertical array of temperature sensors 1730 may be distributed throughout the storage tank 1720. The sensors are provided to monitor temperature of stored water at various heights within the storage tank 1720. The monitored temperature may be communicated to a controller thereby allowing the amount of available hot water contained in the storage tank 1720 to be reported.

It will be appreciated that the positions and orientation of the storage tank 1700, the heating tank 1794, the DC heat pump 1780 and the AC heating unit 1740 of may be different than the positions indicated herein. In particular, where the DC heat pump is integrated into a thermosyphonic heating module, it may be advantageous to position the heating tank 1794 lower than the storage tank 1700 so that the natural convection currents generate a circulation of colder water from the storage tank 1700 downwards to the heating tank 1794 and heated water from the heating tank 1794 upwards to the storage tank 1700.

The DC heat pump 1780 is wired to a DC power supply such as a solar panel 1150 including an array of photovoltaic cells. The positive DC output terminal 1152 is wired to the DC heat pump 1780 via a DC positive transmission line 1172 and the negative DC output terminal 1154 is wired to the DC heat pump 1780 via a DC negative transmission line 1174.

The AC power supply may be provided via a mains connection to a power grid drawing power from a power station 9110. The mains connection typically has a live transmission line 9132 and a neutral transmission line 9134 leading to a pair of AC input terminals.

Figure 6A:
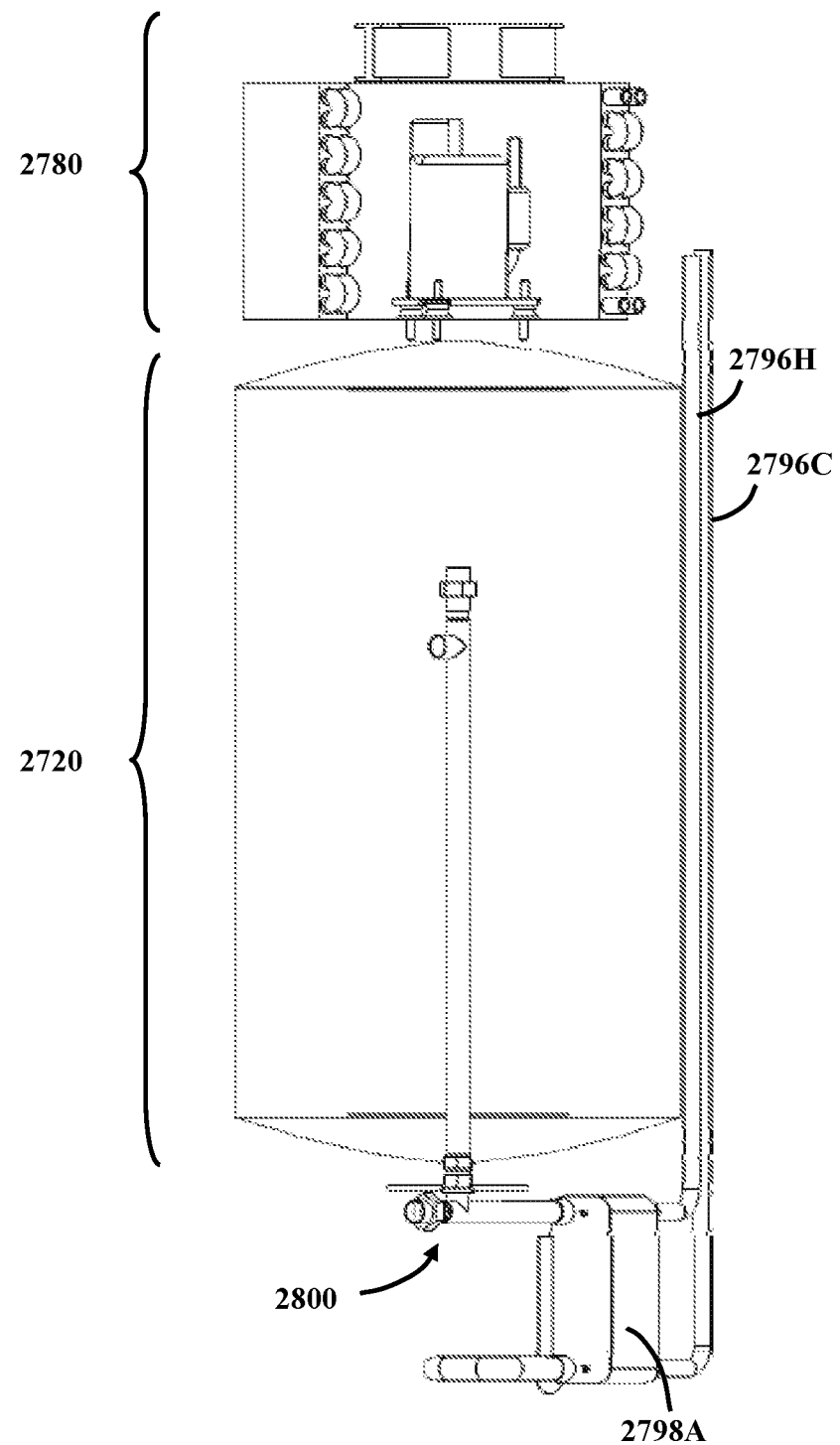
FIGS. 6A and 6B illustrate possible configurations for a storage tank and heat pump for implementing the solar heating system.

Reference is now made to FIG. 6A which illustrates a possible configuration for implementing the solar heating system in which a heat pump 2780 is mounted to a storage tank 2720. A thermosyphonic heat transfer unit comprising a cold water advance pipe 2796C extends from a lower portion of the storage tank 2720 to the heat pump 2780 and a hot water return pipe 2796 extends from the heat pump to an upper portion of the thermosyphonic water heating unit 2798A.

It is noted that the hot water return pipe 2796H is connected to the storage tank 2720 via a passive back-flushing module 2800 which includes a cold water inlet pipe configured such that whenever hot water is drawn from the storage tank therefrom, cold water is drawn into the storage tank via the heat exchanger but against the direction of normal flow therethrough, such that any limescale built up therewithin is flushed.

Figure 6B:
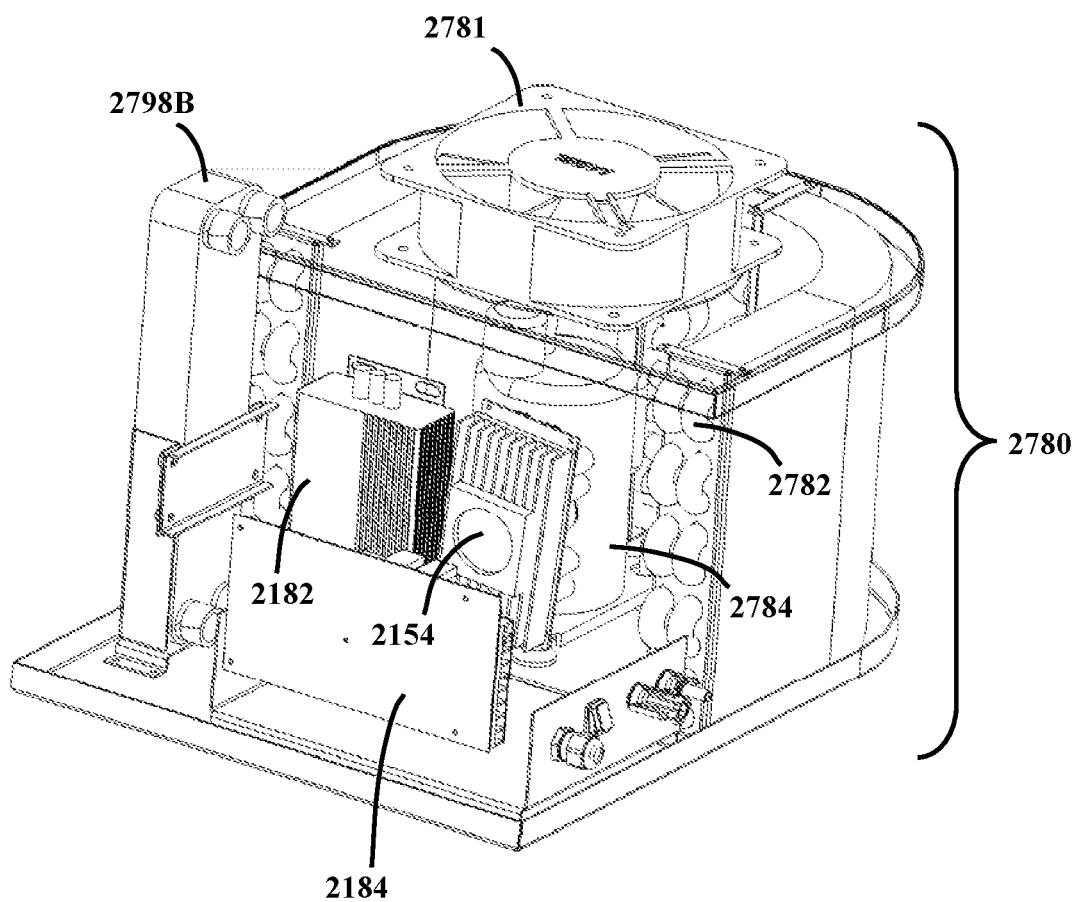

Referring now to FIG. 6B, a possible heat pump 2780 is illustrated including a fan 2781, a radiator 2782, a compressor 2784, a thermosyphonic water heating unit, such as a heat exchanger 2798B, a controller mounted upon a printed circuit board 2184, a PV solar panel power converter 2154, and a compressor inverter 2182.

Figure 7:
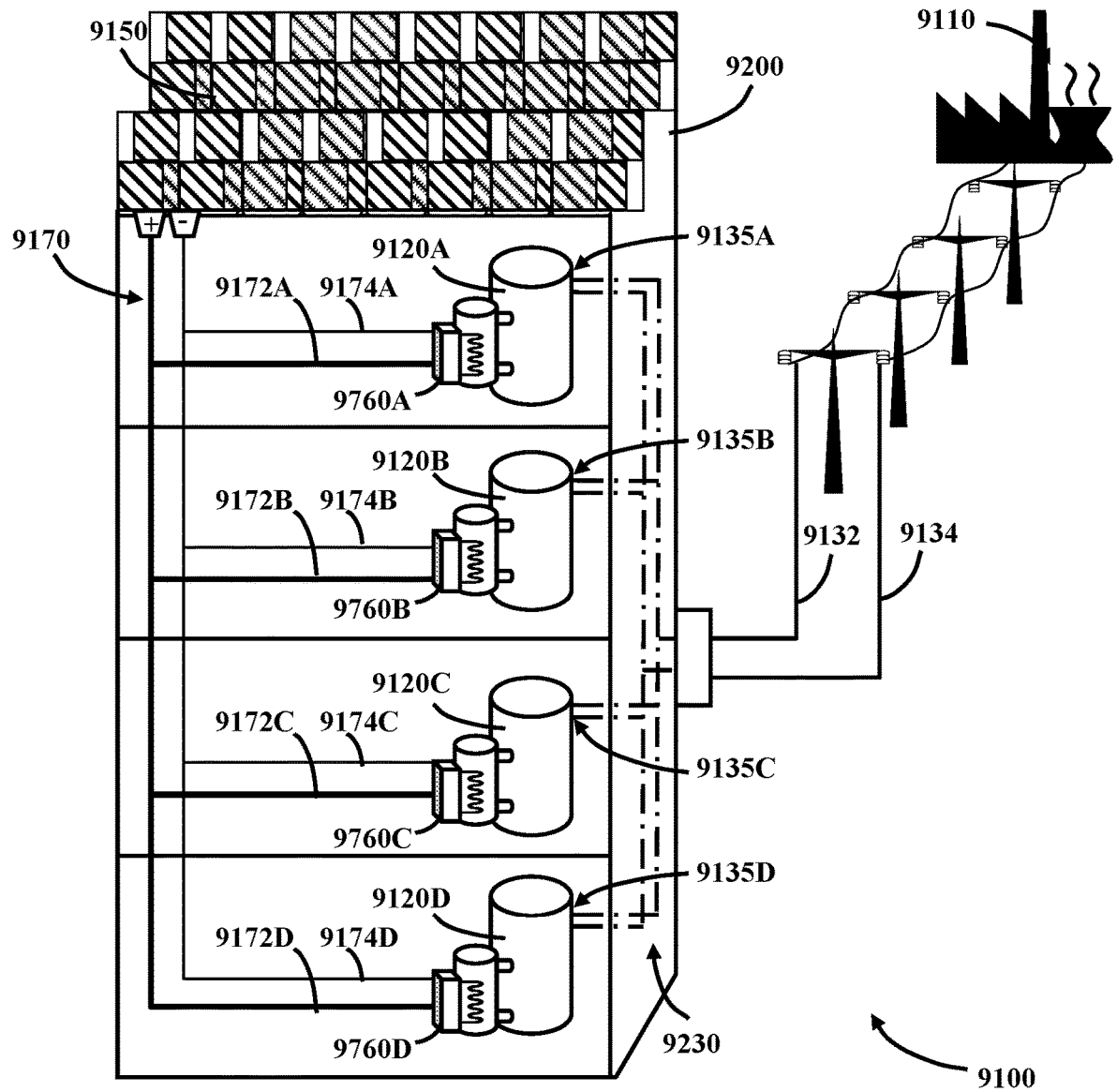
FIG. 7 is a schematic representation of the heat pump embodiment of the solar heating system integrated into a multiple unit building sharing a common array of solar panels.

Referring now to FIG. 7 a schematic representation is presented of the heat pump embodiment of the solar heating system 9100 for use in a building 9200 having multiple storage heating tanks 9135A-D all drawing power from both an AC power source 9110 and a common array of roof mounted solar panels 9150. Additionally or alternatively, in other embodiments, dedicated solar panels may be provided for each storage heating tank within the building as required.

The building 9200 includes a central AC mains line 9230 connected to the AC power source 9110 such as a power station, generator or the like, via live and neutral AC transmission lines 9132, 9134. Each storage heating tank 9120A-D is connected to the AC mains line 9230 via its own pair of AC input terminals 8135A-D.

Furthermore, the building has a set of roof mounted solar panels 9150 which are connected to a central DC power transmission line 9170 which may provide DC power to each DC heat pump heating unit 9760A-D via dedicated DC positive and negative transmission lines 9172A-D, 9174A-D. Thus, solar energy may be collected and transferred to the storage heating tanks via electrical conduction transmission lines and DC heating elements rather than via complicated and damage prone fluid communication lines and heat exchangers.

Although only roof mounted solar panels are represented herein, it is noted that wall mounted or window mounted solar panels may be integrated into the system. It is further noted, photovoltaic cells do not require direct sunlight and where necessary may be mounted upon any of a south facing, north facing, east facing, west facing or any other directed wall of a building. Nevertheless, photovoltaic cells may be more effective if orientated towards the sun. Thus in the Northern Hemisphere, south facing solar panels are generally to be preferred and in the Southern Hemisphere, north facing solar panels are generally to be preferred. In other embodiments, solar tracking mountings may be used which are operable to orientate the solar panels towards the sun across an east to west path throughout the day or a north-south path according to the varying elevations of the sun throughout the year.

Figure 8A:
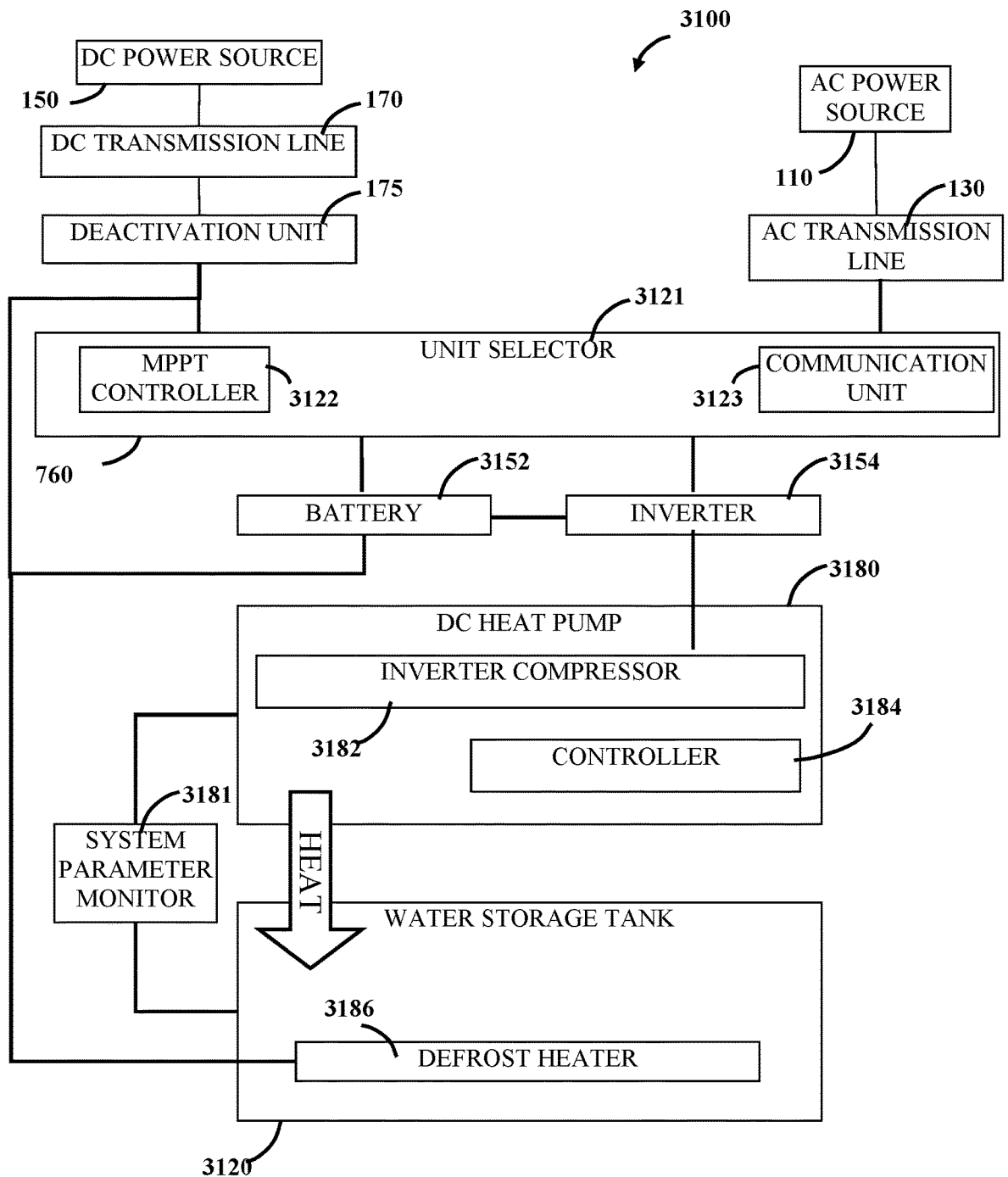
FIG. 8A is a block diagram of a possible hybrid controlled DC heating system according to the invention.

With reference now to the block diagram of FIG. 8, a possible hybrid controlled DC heating system 3100 may draw power from either of a DC power source 150 or an AC power source 110 as required to operate a controllable DC heat pump 3180 according to the invention.

The hybrid controlled DC heating system 3100 includes a unit selector 3121, a battery 3152, an inverter unit 3154, the DC heat pump 3180 having a variable cycle rate inverter compressor 3182 a controller 3184 a water storage tank 3120 and a defrost heater 3186.

The unit selector 3121 may be operable to receive system parameters such as ambient temperature, storage tank temperature, heating tank temperature, DC generated power or the like. The system parameters may be used to determine whether power is drawn from the DC power source 150, the AC power source 110 or both.

Optionally the system may further include a communication unit 3123 operable to communicate with an external control device (not shown). Accordingly monitored data may be sent to an external control device and control signals may be received from the external control device accordingly. Various communication protocols may be used with the system as are known in the art such a cellular network communication, wireless communication, WiFi, Zigbee, Bluetooth, infrared communication, ultrasonic communication, audio communication and the like as well as combinations thereof.

Where required, DC power may be stored in a battery 3152, or other power storage unit such as a capacitor, a fuel cell or the like, when not required by the heat pump 3180.

The inverter 3154 converts AC to DC and then generates a power output having a controllable frequency, duty cycle and amplitude. The output of the inverter 3154 may be used to power a controllable inverter compressor 3182. Accordingly to the embodiments, the inverter 3154 may draw DC power from the battery 3152 or directly from the DC power source 150 where necessary.

The controller 3184 may use recorded system parameters to determine the optimum rotation rate for the inverter controller 3182 and to control the inverter 3154 accordingly. Furthermore, the controller 3184 may determine when a defrost cycle is necessary during which the defrost heater 3186 may be operated, drawing power from the DC power source 150, the battery 3152 or from the AC power source 110 as suits requirements.

It is further noted that a system parameter monitor 3181 may further be provided to monitor and record system parameters. The system parameter monitor 3181 may include a variety of monitors such as but not limited to: a vertical array of temperature sensors distributed throughout the storage tank, the sensors operable to monitor temperature of stored water at multiple heights; a high pressure sensors configured and operable to monitor pressure of refrigerant exiting a compressor of the DC heat pump, a low pressure sensor configured and operable to monitor pressure of refrigerant entering the compressor of the DC heat pump; a compressor rotation monitor configured and operable to record the rotation rate of the compressor; an external temperature sensor configured and operable to record ambient temperature in the vicinity of the storage tank; a high gas temperature sensor configured and operable to monitor temperature of refrigerant entering a heat exchanger; a low gas temperature sensor configured and operable to monitor temperature of refrigerant exiting the heat exchanger; a heat-exchange water high temperature sensor configured and operable to monitor temperature of water entering the heat exchanger; a heat-exchange water low temperature sensor configured and operable to monitor temperature of water exiting the heat exchanger; a DC current monitor configured and operable to monitor current drawn from the DC power source; a voltage monitor configured and operable to monitor voltage across the DC power source; an AC current monitor configured and operable to monitor current drawn from the electricity grid; a metering device gas IN temperature sensor configured and operable to monitor temperature of refrigerant entering a metering device; a metering device gas OUT temperature sensor configured and operable to monitor temperature of refrigerant exiting a metering device; a metering device status monitor configured and operable to monitor the status of a metering device of the DC heat pump, and the like as well as combinations thereof.

The output of such a system monitor may be presented, for example in a table such as shown in FIG. 8B. It will be appreciated that the monitored parameters may be communicated to a control system and thereby used to maintain and manage delivery of water to end users remotely.

Still further, a Maximum Power Point Tracking (MPPT) solar charge controller 3122 thereby regulating the voltage output of the photovoltaic array so that they operate at the most efficient power point. Thus for example in low light colder conditions such as during winter or on a cloudy day the MPPT solar charge controller may adjust the output voltage to better supply power to the inverter 3154 or to charge the battery 3152 as suits current conditions.

FIGS. 9A-D are a set of block diagrams illustrating various embodiments for the arrangements of heating systems according to embodiments described herein.

Figure 9A:
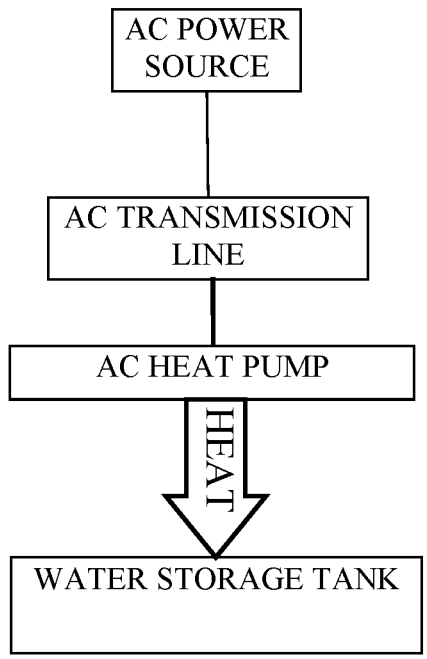
FIGS. 9A-D are a set of block diagrams illustrating various embodiments for the arrangements of heating system.

FIG. 9A represents an embodiment including an AC heat pump being powered directly from the AC power source.

Figure 9B:
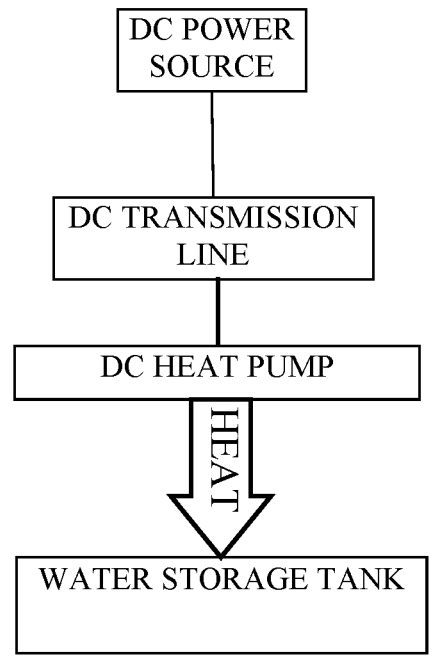

FIG. 9B represents an embodiment including a DC heat pump being powered directly from the DC power source.

Figure 9C:
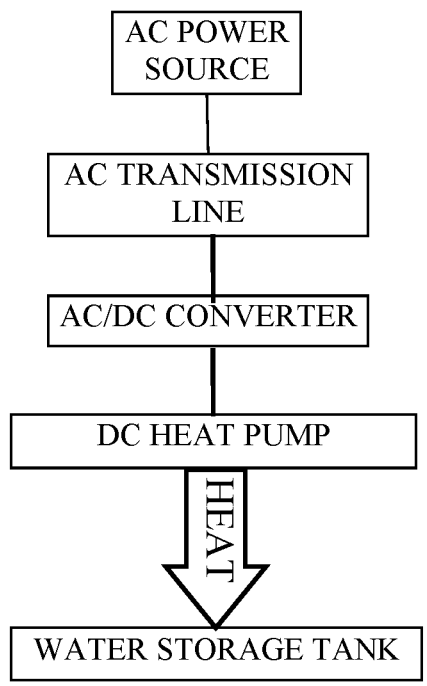

FIG. 9C represents an embodiment including a DC heat pump being powered by an AC power source via an AC/DC converter configured to receive AC power and to output DC power, for example a diode, a half-wave rectifier, a full wave rectifier, a Graetz bridge, flyback transformer, a flyback converter, a full-bridge converter, a half-bridge converter and a forward converter. or the like.

Figure 9D:
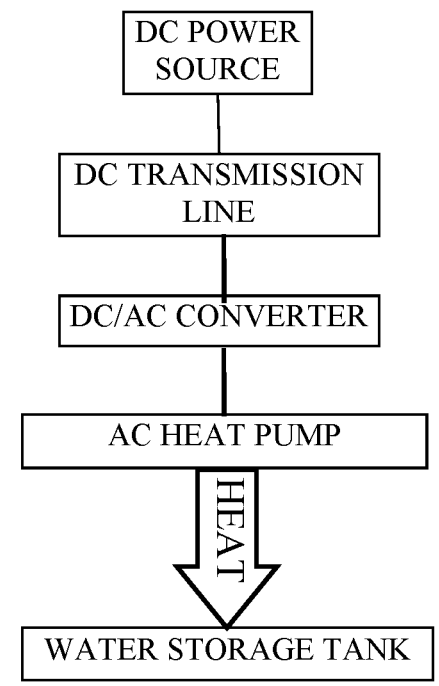

FIG. 9D represents an embodiment including an AC heat pump being powered by an DC power source via an DC/AC converter configured to receive DC power and to output AC power, for example an inverter, flyback transformer, a flyback converter, a full-bridge converter, a half-bridge converter and a forward converter.

FIGS. 10A-I show possible screenshots for an application for controlling the heating system remotely. The application may be configured to communicate with a communication unit of the heating system.

Figure 10A:
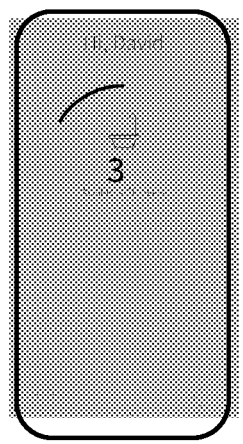
FIGS. 10A-I are screenshots of a possible control application for controlling a heating system of the disclosure.
Figure 10B:
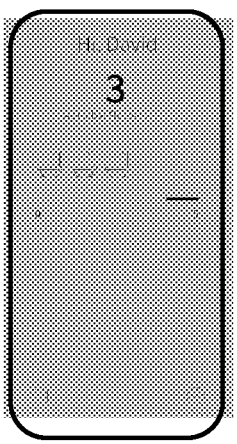
Figure 10C:
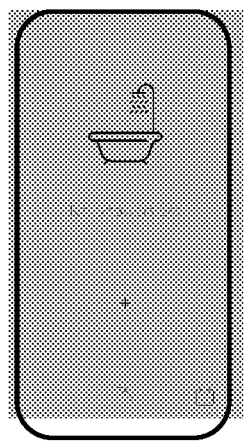

FIGS. 10A and 10B show possible screenshots indicating the status of the hot water available for use. It is noted that the status indicator uses monitored data collected by sensors within the storage tank indicating how much hot water will be available. The information may be presented in user friendly units such as 'available showers' although other units may be used as suit requirements. It will be appreciated that the calculation of how much hot water is available may be enabled by the provision of a vertical array of sensors within the storage tank monitoring heat at various depths.

Figure 10D:
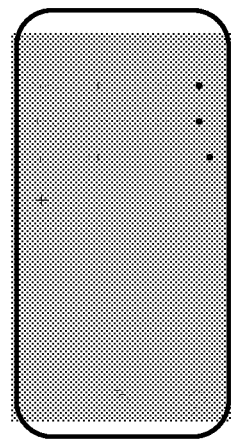
Figure 10E:
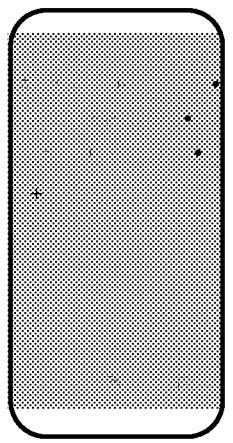
Figure 10F:
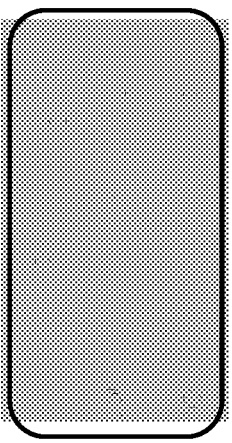
Figure 10G:
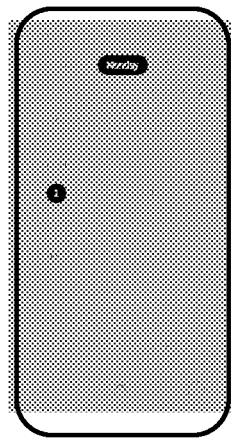

FIGS. 10C-G show possible screenshots used via which a user may schedule availability of hot water by time and quantity required. Thus for example the screenshot of FIG. 10C, which may be presented when no schedule is set includes a plus icon via which the scheduling screen such as shown in FIGS. 10F and 10G may be accessed. Alternatively, when a schedule has been set, this may be presented in an editable list format such as shown in FIGS. 10D and 10E.

As indicated in FIG. 10G, a schedule may define time parameters such as a day, hour and minute alongside a quantity parameter such as number of showers required. It will be appreciated that such scheduling may reduce the amount of wasted energy used to heat water which remains unused.

Figure 10H:
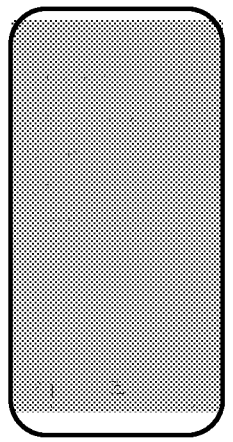
Figure 10I:
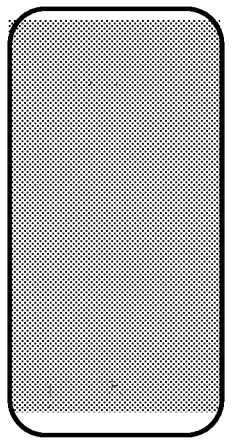

The Screenshots of FIGS. 10H and 10I represent general settings or setup via which a user may determine a default amount water to be available when no other schedule has been set.

Figure 11:
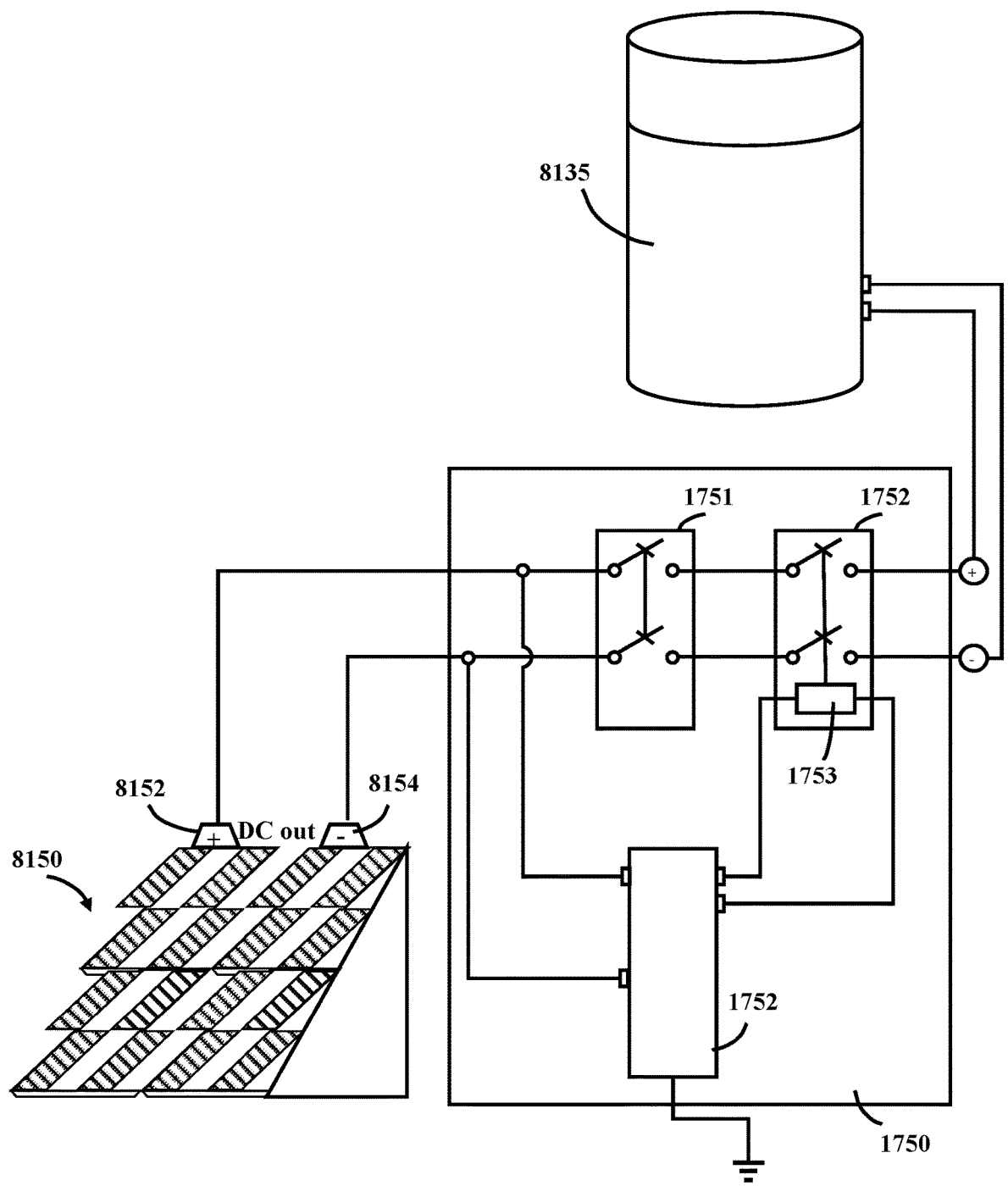
FIG. 11 is a schematic diagram of a possible DC deactivation circuit for use with the heating system of the disclosure.

Referring now to FIG. 11, a possible DC deactivation unit 1750 is schematically represented, including a DC circuit breaker 1751, a triggered DC circuit breaker 1752 and a DC current monitor 1752. The DC circuit breaker 1751, such as a LPMNSD DZ47DC C20 for example, the circuit breaker 1751 includes a first DC switch configured to disconnect the positive terminal 8152 of the DC power source 8150 from the DC water heater 8135 and a second DC switch configured to disconnect the negative terminal 8154 of the DC power source 8150 from the DC water heater 8135. The triggered circuit breaker 1752 includes a trip switch 1753 connected to the current monitor 1752. The DC current monitor such as an ABB CM-IWS.1 insulation monitoring relay, of the like may be configured and operable to trigger the DC circuit breaker when a current leakage is detected thereby disconnecting the water heater from the DC power source.

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number, and a second indicate number and "ranging/ranges from" a first indicate number "to" a second indicate number are used herein interchangeably and are meant to include the first and second indicated numbers and all the fractional and integral numerals there between. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described hereinabove as well as variations and modifications thereof, which would occur to persons skilled in the art upon reading the foregoing description.

The invention claimed is:

1. A water heating system comprising:
   at least one storage tank;
   a heat exchanger;
   at least one DC heat pump operable to receive power from a DC power source and to heat water via the heat exchanger;
   a cold water advance pipe extending from a lower portion of the storage tank to a lower portion of the heat exchanger;
   a hot water return pipe extending from an upper portion of the heat exchanger to an upper portion of the storage tank;
   a passive back-flushing module comprising a cold water inlet pipe connected to the hot water return pipe and configured such that whenever hot water is drawn from the storage tank, cold water is drawn into the storage tank through the heat exchanger and the cold water advance pipe;
   a vertical array of temperature sensors distributed throughout the storage tank, the sensors operable to monitor temperature of stored water at multiple heights; and
   a communication unit operable to communicate monitored data to an external control device,
   the system further comprising a common array of solar panels electrically connected to a plurality of the DC heat pumps, each the DC heat pump associated with a thermosyphonic water heating unit operable to heat water stored in an associated storage tank.

2. A water heating system comprising:
   at least one storage tank;
   a heat exchanger;
   at least one DC heat pump operable to receive power from a DC power source and to heat water via the heat exchanger;
   a cold water advance pipe extending from a lower portion of the storage tank to a lower portion of the heat exchanger;
   a hot water return pipe extending from an upper portion of the heat exchanger to an upper portion of the storage tank;
   a passive back-flushing module comprising a cold water inlet pipe connected to the hot water return pipe and configured such that whenever hot water is drawn from the storage tank, cold water is drawn into the storage tank through the heat exchanger and the cold water advance pipe;
   a vertical array of temperature sensors distributed throughout the storage tank, the sensors operable to monitor temperature of stored water at multiple heights; and
   a communication unit operable to communicate monitored data to an external control device,
   the system further comprising a DC deactivation unit operable to disconnect the DC heat pump from the DC power source, the DC deactivation unit comprising:
   at least one DC circuit breaker comprising a first DC switch configured to disconnect a positive terminal of the DC power source from the DC heat pump and a second DC switch configured to disconnect a negative terminal of the DC power source from the DC heat pump; and
   at least one current monitor configured and operable to trigger the at least one DC circuit breaker if a current leakage is detected thereby disconnecting DC heat pump from the DC power source.

* * * * *